United States Patent

Kiekens et al.

Patent Number: 5,420,281
Date of Patent: May 30, 1995

[54] PHOTOGRAPHIC MATERIAL CONTAINING A NON-SENSITIZING DYE ABSORBING AT 670 NM

[75] Inventors: Eric Kiekens, Kesselo-Lo; Paul Callant, Edegem; Roland Claes, Dendermonde, all of Belgium

[73] Assignee: AGFA-Gevaert, N.V., Mortsel, Belgium

[21] Appl. No.: 298,665

[22] Filed: Aug. 31, 1994

Related U.S. Application Data

[62] Division of Ser. No. 194,511, Feb. 10, 1994, Pat. No. 5,362,612.

Foreign Application Priority Data

Feb. 19, 1993 [EP] European Pat. Off. ............ 93200476

[51] Int. Cl.⁶ .................. C07D 401/06; C07D 409/14
[52] U.S. Cl. ..................................... 546/165; 546/166
[58] Field of Search ............... 546/167, 172, 165, 166, 546/174, 176, 180

[56] References Cited

U.S. PATENT DOCUMENTS

| | | | |
|---|---|---|---|
| 4,115,413 | 9/1978 | Raue | 260/390 |
| 4,929,732 | 5/1990 | Meier | 546/158 |

*Primary Examiner*—C. Warren Ivy
*Assistant Examiner*—Evelyn Huang
*Attorney, Agent, or Firm*—Breiner & Breiner

[57] ABSTRACT

A photographic material is disclosed comprising a support, at least one silver halide emulsion layer, and optionally one or more non-photosensitive hydrophylic layer(s), characterized in that at least one of said emulsion layer(s) and/or non-photosensitive layer(s) contains a triphenylmethane dye, absorbing around 670 nm, represented by general formula (ID):

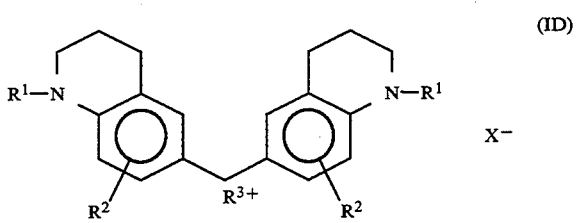

wherein $R^1$ and $R^2$ each independently represents hydrogen unsubstituted or substituted alkyl, or unsubstituted or substituted aryl, $R^3$ represents an electron-withdrawing group, and the substance contains at least two water-solubilizing groups, and $X^-$ represents an anion, or an intramolecular anionic group.

The triphenylmethane dyes can serve as filter dye, acutance dye, or anti-halation dye. The claimed photographic materials are especially suited for exposure by a laser diode emitting at 670 nm.

4 Claims, No Drawings

PHOTOGRAPHIC MATERIAL CONTAINING A NON-SENSITIZING DYE ABSORBING AT 670 NM

This is a division of application Ser. No. 08/194,511, filed Feb. 10, 1994, now U.S. Pat. No. 5,362,612.

FIELD OF THE INVENTION

The present invention relates to photographic materials, and more particularly, to photographic materials containing a new type of light-absorbing non-sensitizing dye.

BACKGROUND OF THE INVENTION

Light-absorbing dyes incorporated in silver halide photographic materials can accomplish a variety of goals, including their use as filter dyes, acutance dyes or anti-halation dyes.

When present in a non-photosensitive top layer or intermediate layer they typically serve as filter dyes eliminating an unwanted part of the light spectrum of the exposure source. A well-known example is the yellow filter layer usually present in colour photographic materials in order to prevent blue light from reaching the green sensitive and red sensitive layers. Another example is formed by UV-absorbing compounds, usually present in the top protective layer, which prevent photochemical deterioration of the image dyes formed by colour development. Examples of useful UV-absorbers include the cyanomethyl sulfone-derived merocyanines of U.S. Pat. No. 3,723,154, the thiazolidones, benzotriazoles and thiazolothiazoles of U.S. Pat. Nos. 2,739,888, 3,253,921, 3,250,617 and 2,739,971, the triazoles of U.S. Pat. No. 3,004,869, and the hemioxonols of U.S. Pat. No. 3,125,597.

On the other hand light-absorbing dyes when present in the emulsion layer can serve as so-called "acutance dyes" or "screening dyes" improving the image sharpness by reducing the sidewise scattering of light by the emulsion grains.

In a third application light-absorbing dyes act as "anti-halation dyes" improving the image sharpness by diminishing the upward reflection of light by the support into the emulsion layer. For this purpose the dye can be incorporated in an undercoat, being a non-photosensitive layer between the emulsion layer and the support, or it can be incorporated in the base itself, or preferably, it can be present in one or more backing layers of the photographic material.

Useful dyes absorbing in the visible spectral region include, for instance, the coloured pigments of U.S. Pat. No. 2,697,037, the pyrazolone oxonol dyes of U.S. Pat. No. 2,274,782, the styryl and butadienyl dyes of U.S. Pat. No. 3,423,207, the diaryl azo dyes of U.S. Pat. No. 2,956,879, the merocyanine dyes of U.S. Pat. No. 2,527,583, the merocyanine and oxonol dyes of U.S. Pat. Nos. 3,486,897, 3,652,284 and 3,718,472, and the enaminohemioxonol dyes of U.S. Pat. No. 3,976,661. Absorbing dyes can be added as particulate dispersions as disclosed in U.S. Pat. No. 4,092,168, EP 0 274 723 and EP 0 299 435.

Infra-red absorbing dyes are described in EP 0 251 282, in EP 0 288 076, and in U.S. Pat. No. 4,839,265.

Dyes absorbing in the red spectral region of the di- or triphenylmethane type, some of which bear an electron-withdrawing group, are disclosed in e.g. GB 769,749, U.S. Pat. No. 2,282,890, DE 1,038,395, FR 2,234,585, JP-A-59-228250, U.S. Pat. No. 2,252,052 and A. Guyot, Compt.Rend. Vol. 114 (1907) p. 1120. Some of the compounds disclosed contain one or more water-solubilizing groups.

Light-absorbing dyes must fulfill a number of strict requirements. They should wash-out or decolourize as completely as possible during photographic processing in order to minimize unwanted residual dye stain. When washed-out they or their reaction products should not deteriorate the physical or sensitometric properties of the photographic material during prolonged continuous processing. Moreover, in order to be effective during exposure, the spectral characteristics of incorporated anti-halation dyes or acutance dyes should match as good as possible the spectral sensitivity distribution of the emulsion layer. In its turn this spectral sensitivity distribution has to be tuned to the spectral characteristic of the exposure source.

In recent years new techniques of image recording have emerged wherein the exposure source of the recording apparatus is a laser unit. For instance, one application of lasers as exposure units is situated in the field of radiographic monitoring photography where a hard copy of radiographic information has to be produced. Other applications are situated in the pre-press field of phototype-setting and image-setting, where recorders are marketed which employ Ar ion lasers, He-Ne lasers or solid state semiconductor lasers, also called laserdiodes, as exposure source. The latter type of laser, the laserdiode, shows some advantages compared to other laser types such as low cost price, small size, long life time and no need for an acoustic-optical modulator. Generally the emission wavelength of these semiconductor laser beams is longer than 700 nm and mostly longer than 750 nm. So photographic materials appropriate for exposure by devices employing such laserdiodes must be sensitized for the near infra-red region of the radiation spectrum. Suitable photographic materials to be used with semiconductor laser device are disclosed in Japanese Unexamined Patent Publication (Kokai) No 61752/85 and U.S. Pat. No. 4,784,933. Commercial infra-red sensitized film and paper were announced by Eastman Kodak Co in "Proceedings Lasers in Graphics, Electronic Publishing in the '80's, Vol 2 (September 1985) p. 508, and put on the market lateron. Other manufacturers followed including Agfa-Gevaert N.V. and Fuji Photo Film Co. An example of an imagesetter using a laserdiode exposure is the PROSET 9800 apparatus marketed by Miles Inc., Agfa division.

One problem in the field of imaging by laserdiodes emitting in the near infra-red is the rather high required sensitivity level of the infra-red sensitized photographic material due to the low energy output of this laserdiode type which is in the order of a few milli-Watts. A second problem consists in the usually poor storage quality of emulsions sensitized with long-chain cyanine dyes. Moreover, technicians supplying maintenance for image-setters feel the invisibility of the infra-red rays as a practical handicap for their work.

For all these reasons some manufacturers of image-setters moved to laserdiodes emitting in the visible red spectral region, and more particularly, to laserdiodes emitting at 670 nm. So the ACCUSET apparatus, marketed by Miles Inc., Agfa division, and the LINO 670 image-setter, marketed by Linotype Co., are equipped with this new type of solid state laser. As a consequence photographic phototype- and image setting materials have to be adapted to this new wavelength of laser emission. More particularly the spectral sensitivity and the absorption spectrum of acutance- and anti-halation dyes should be suitable for 670 nm.

The present invention represents an extension on the teachings on triphenylmethane dyes.

It is a first object of the present invention to provide a new class of light-absorbing dyes showing good absorption at 670 nm.

It is a second object of the present invention to provide photographic red sensitized materials with improved sharpness on exposure at 670.

SUMMARY OF THE INVENTION

The first object of the present invention is realized by providing a triphenylmethane dye represented by following general formula (ID):

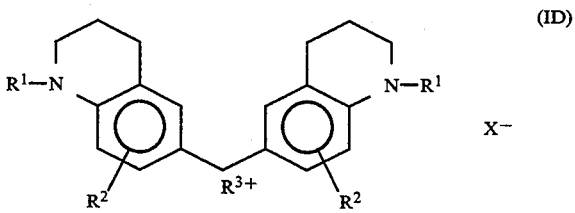
(ID)

wherein $R^1$ and $R^2$ each independently represents hydrogen, unsubstituted or substituted alkyl, or unsubstituted or substituted aryl, $R^3$ represents an electron-withdrawing group, e.g. a group selected from the group consisting of Cl, $COR^4$, $COOR^4$, $CF_3$, CN, $NO_2$, $SO_2{}^2R^4$, $CON(R^4)_2$,

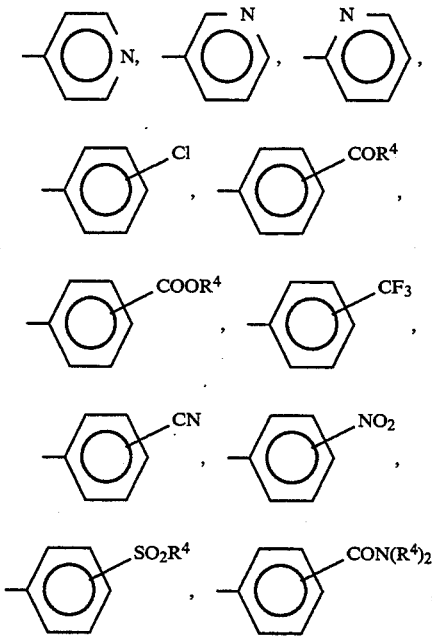

wherein $R^4$ has one of the significances given for $R^1$ and $R^2$, and wherein the dye contains at least two water-solubilizing groups, e.g. groups selected from the group consisting of —$SO_3H$, —COOH, —$SO_2NHR^5$, —$NHSO_2R^5$, —$CONHR^5$ and

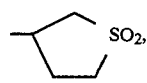

or a salt thereof, and wherein $R^5$ has one of the significances given for $R^1$ and $R^2$, and $X^-$ represents an anion, or an intramolecular anionic group.

The second object of the present invention is realized by providing a photographic material comprising a support, at least one silver halide emulsion layer, and optionally one or more non-photosensitive hydrophilic layer(s), characterized in that at least one of said emulsion layer(s) and/or non-photosensitive layer(s) contains a triphenylmethane dye as defined above.

DETAILED DESCRIPTION OF THE INVENTION

Useful examples of triphenylmethane type dyes according to the present invention are listed below. Their synthesis will be described in preparative examples furtheron.

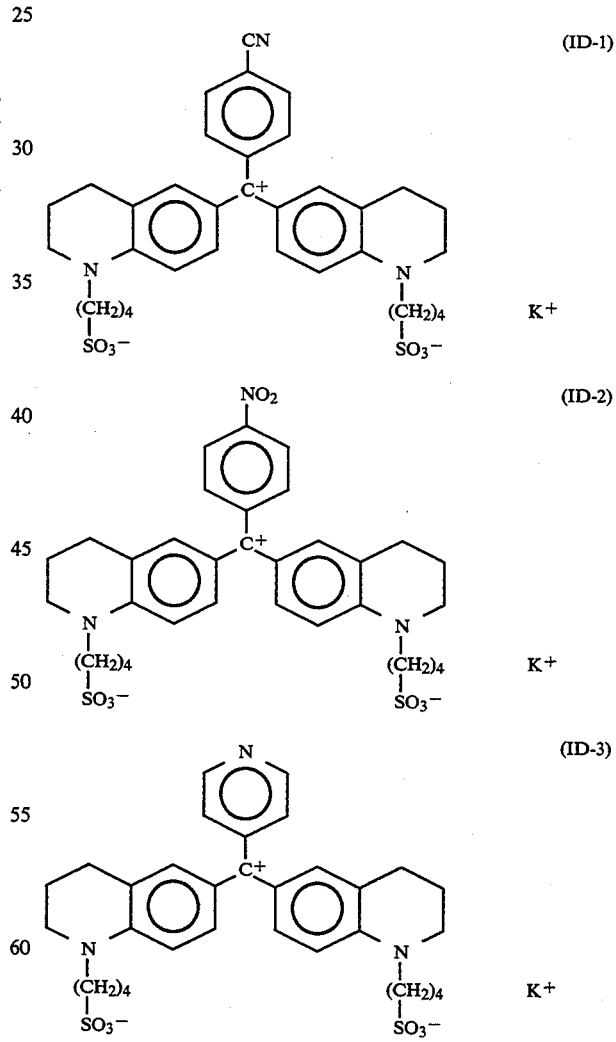

A conventional known absorbing dye not belonging to the invention but serving as a control dye in the photographic example given furtheron is following compound:

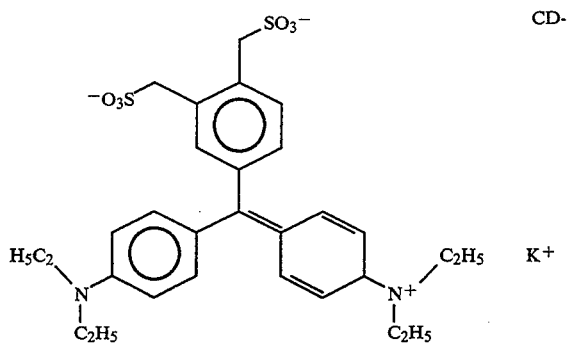

CD-1

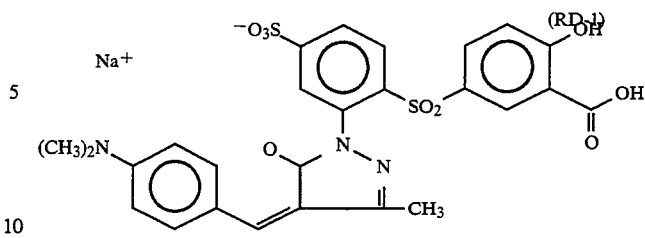

Dependent on their particular application the invention dyes are incorporated in the emulsion layer or in a non-light-sensitive layer. Preferably they are incorporated in such an amount per m² that an optical density at 670 nm ranging between 0.1 and 1.5 in that particular layer is obtained.

For most purposes the application of only one particular invention dye will be sufficient but, in principle, a mixture of two or more dyes can be applied.

In principle the invention dyes can be incorporated in any type of photographic material but the benifits of the present invention will only become fully apparent when they are incorporated in a red sensitized photographic material showing good spectral sensitivity around 670 nm.

Useful spectral sensitizers for 670 nm are e.g. trinuclear merocyanine dyes as disclosed in U.S. Pat. No. 5,116,722. A particularly useful sensitizing dye (see photographic example furtheron) is following compound (SD-1):

The emulsion or mixture of emulsions of the photographic material in connection with the present invention can be incorporated in one single layer but, alternatively, a double emulsion layer or even a multiple layer pack can be applied.

The halide composition of the silver halide emulsions used in accordance with the present invention is not specifically limited and may be any composition selected from e.g. silver chloride, silver bromide, silver iodide, silver chlorobromide, silver bromoiodide, and silver chlorobromoiodide.

The photographic emulsion(s) can be prepared from soluble silver salts and soluble halides according to different methods as described e.g. by P. Glafkidès in "Chimie et Physique Photographique", Paul Montel, Paris (1967), by G. F. Duffin in "Photographic Emulsion Chemistry", The Focal Press, London (1966), and by V. L. Zelikman et al in "Making and Coating Photographic Emulsion", The Focal Press, London (1966). They can be prepared by mixing the halide and silver solutions in partially or fully controlled conditions of temperature, concentrations, sequence of addition, and rates of addition. The silver halide can be precipitated according to the single-et method, the double-jet method, the conversion method or an alternation of these different methods.

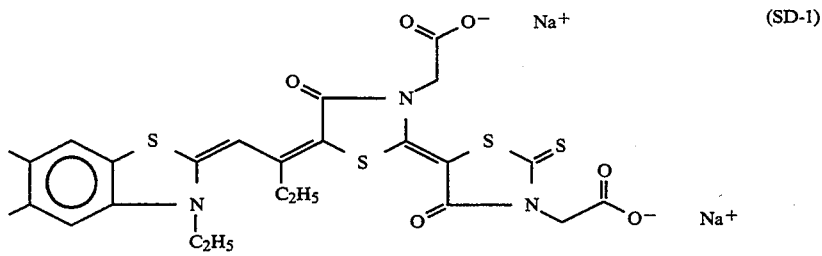

(SD-1)

The silver halide particles of the photographic emulsion(s) may have a regular crystalline form such as a cubic or octahedral form or they may have a transition form. They may also have an irregular crystalline form such as a spherical form or a tabular form, or may otherwise have a composite crystal form comprising a fixture of said regular and irregular crystalline forms.

The silver halide grains may have a multilayered grain structure. According to a simple embodiment the grains may comprise a core and a shell, which may have different halide compositions and/or may have undergone different modifications such as the addition of dopes. Besides having a differently composed core and shell the silver halide grains may also comprise different phases inbetween.

Two or more types of silver halide emulsions that have been prepared differently can be mixed for forming a photographic emulsion for use in accordance with the present invention.

Other trinuclear merocyanines are described in CH 677,409. Other useful classes of sensitizers around 670 nm are rhodacyanines as disclosed in U.S. Pat. No. 4,950,036 and in Unexamined Japanese Patent Publications (Kokai) 63-212941 and 02-02545; furtheron pentamethincyanines derived from benzimidazole as disclosed in U.S. Pat. No. 4,717,650.

Apart from the light-absorbing dye(s) and the sensitizing dye(s) a so-called "recognition dye" can be present, preferably in a backing layer. Such a dye exerts no photographic activity but enhances the visual difference under faint dark room illumination between the emulsion layer side and the backing layer side. A preferred recognition dye is following compound:

The average size of the silver halide grains may range from 0.05 to 1.0 micron, preferably from 0.2 to 0.5 micron. The size distribution of the silver halide particles can be homodisperse or heterodisperse.

The silver halide crystals can be doped with $Rh^{3+}$, $Ir^{4+}$, $Cd^{2+}$, $Zn^{2+}$ or $Pb^{2+}$.

The emulsion can be desalted in the usual ways e.g. by dialysis, by flocculation and re-dispersing, or by ultrafiltration.

The light-sensitive silver halide emulsions are preferably chemically sensitized as described e.g. in the above-mentioned "Chimie et Physique Photographique" by P. Glafkidès, in the above-mentioned "Photographic Emulsion Chemistry" by G. F. Duffin, in the above-mentioned "Making and Coating Photographic Emulsion" by V. L. Zelikman et al, and in "Die Grundlagen der Photographischen Prozesse mit Silberhalogeniden" edited by H. Frieser and published by Akademische Verlagsgeselischaft (1968). As described in said literature chemical sensitization can be carried out by effecting the ripening in the presence of small amounts of compounds containing sulphur e.g. thiosulphate, thiocyanate, thioureas, sulphites, mercapto compounds, and rhodamines. The emulsions can be sensitized also by means of gold-sulphur ripeners or by means of reductors e.g. tin compounds as described in GB 789,823, amines, hydrazine derivatives, formamidine-sulphinic acids, and silane compounds. Chemical sensitization can also be performed with small amounts of Ir, Rh, Ru, Pb, Cd, Hg, Tl, Pd, Pt, or Au. One of these chemical sensitization methods or a combination thereof can be used.

The silver halide emulsion (s) for use in accordance with the present invention may comprise compounds preventing the formation of fog or stabilizing the photographic characteristics during the production or storage of photographic elements or during the photographic treatment thereof. Many known compounds can be added as fog-inhibiting agent or stabilizer to the silver halide emulsion. Suitable examples are e.g. the heterocyclic nitrogen-containing compounds such as benzothiazolium salts, nitroimidazoles, nitrobenzimidazoles, chlorobenzimidazoles, bromobenzimidazoles, mercaptothiazoles, mercaptobenzothiazoles, mercaptobenzimidazoles, mercaptothiadiazoles, aminotriazoles, benzotriazoles, nitrobenzotriazoles, mercaptotetrazoles, mercaptopyrimidines, mercaptotriazines, benzothiazoline-2-thione, oxazoline-thione, triazaindenes, tetrazaindenes and pentazaindenes, especially those described by Birr in Z. Wiss. Phot. 47 (1952), pages 2-58, triazolopyrimidines such as those described in GB 1,203,757, GB 1,209,146, JA-Appl. 75-39537, and GB 1,500,278, and 7-hydroxy-s-triazolo-[1,5-a]-pyrimidines as described in U.S. Pat. No. 4,727,017, and other compounds such as benzenethiosulphonic acid, benzenethiosulphinic acid and benzenethiosulphonic acid amide. Other compounds that can be used as fog-inhibiting compounds are metal salts such as e.g. mercury or cadmium salts and the compounds described in Research Disclosure N° 17643 (1978), Chapter VI.

The fog-inhibiting agents or stabilizers can be added to the silver halide emulsion prior to, during, or after the ripening thereof and mixtures of two or more of these compounds can be used.

Besides the silver halide another essential component of a light-sensitive emulsion layer is the binder. The binder is a hydrophilic colloid, preferably gelatin. Gelatin can, however, be replaced in part or integrally by synthetic, semi-synthetic, or natural polymers. Synthetic substitutes for gelatin are e.g. polyvinyl alcohol, poly-N-vinyl pyrrolidene, polyvinyl imidazole, polyvinyl pyrazole, polyacrylamide, polyacrylic acid, and derivatives thereof, in particular copolymers thereof. Natural substitutes for gelatin are e.g. other proteins such as zein, albumin and casein, cellulose, saccharides, starch, and alginates. In general, the semi-synthetic substitutes for gelatin are modified natural products e.g. gelatin derivatives obtained by conversion of gelatin with alkylating or acylating agents or by grafting of polymerizable monomers on gelatin, and cellulose derivatives such as hydroxyalkyl cellulose, carboxymethyl cellulose, phthaloyl cellulose, and cellulose sulphates.

The binders of the photographic element, especially when the binder used is gelatin, can be hardened with appropriate hardening agents such as those of the epoxide type, those of the ethylenimine type, those of the vinylsulfone type e.g. 1,3-vinylsulphonyl-2-propanol, chromium salts e.g. chromium acetate and chromium alum, aldehydes e.g. formaldehyde, glyoxal, and glutaraldehyde, N-methylol compounds e.g. dimethylolurea and methyloldimethylhydantoin, dioxan derivatives e.g. 2,3-dihydroxy-dioxan, active vinyl compounds e.g. 1,3,5-triacryloyl-hexahydro-s-triazine, active halogen compounds e.g. 2,4-dichloro-6-hydroxy-s-triazine, and mucohalogenic acids e.g. mucochloric acid and mucophenoxychloric acid. These hardeners can be used alone or in combination. The binders can also be hardened with fast-reacting hardeners such as carbamoylpyridinium salts as disclosed in U.S. Pat. No. 4,063,952.

Beside the light-sensitive emulsion layer(s) the photographic material can contain several non-light-sensitive layers, e.g. a protective top layer, one or more backing layers, and one or more intermediate layers. According to the application the triphenylmethane dyes of the present invention can be incorporated in one of those layers as explained above.

The photographic material of the present invention may further comprise various kinds of surface-active agents in the photographic emulsion layer or in another hydrophilic colloid layer. Suitable surface-active agents include non-ionic agents such as saponins, alkylene oxides e.g. polyethylene glycol, polyethylene glycol/-polypropylene glycol condensation products, polyethylene glycol alkyl ethers or polyethylene glycol alkylaryl ethers, polyethylene glycol esters, polyethylene glycol sorbitan esters, polyalkylene glycol alkylamines or alkylamides, silicone-polyethylene oxide adducts, glycidol derivatives, fatty acid esters of polyhydric alcohols and alkyl esters of saccharides; anionic agents comprising an acid group such as a carboxy, sulpho, phospho, sulphuric or phosphoric ester group; ampholytic agents such as aminoacids, aminoalkyl sulphonic acids, aminoalkyl sulphates or phosphates, alkyl betaines, and amine-N-oxides; and cationic agents such as alkylamine salts, aliphatic, aromatic, or heterocyclic quaternary ammonium salts, aliphatic or heterocyclic ring-containing phosphonium or sulphonium salts. Such surface-active agents can be used for various purposes e.g. as coating aids, as compounds preventing electric charges, as compounds improving slidability, as compounds facilitating dispersive emulsification, as compounds preventing or reducing adhesion, and as compounds improving the photographic characteristics e.g higher contrast, sensitization, and development acceleration. Preferred surface-active coating agents are compounds containing perfluorinated alkyl groups.

The photographic elements in connection with the present invention may further comprise various other additives such as e.g. compounds improving the dimensional stability of the photographic element, UV-absorbers, spacing agents and plasticizers.

Suitable additives for improving the dimensional stability of the photographic elements are e.g. dispersions of a water-soluble or hardly soluble synthetic polymer e.g. polymers of alkyl(meth)acrylates, alkoxy(meth) acrylates, glycidyl (meth) acrylates, (meth)acrylamides, vinyl esters, acrylonitriles, olefins, and styrenes, or copolymers of the above with acrylic acids, methacrylic acids, Alpha-Beta-unsaturated dicarboxylic acids, hydroxyalkyl (meth)acrylates, sulphoalkyl (meth)acrylates, and styrene sulphonic acids.

Spacing agents can be present, preferably in the top protective layer; in general the average particle size of such spacing agents is comprised between 0.2 and 10 micron. They can be soluble or insoluble in alkali. Alkali-insoluble spacing agents usually remain permanently in the photographic element, whereas alkali-soluble spacing agents usually are removed therefrom in an alkaline processing bath. Suitable spacing agents can be made e.g. of polymethyl methacrylate, of copolymers of acrylic acid and methyl methacrylate, and of hydroxypropylmethyl cellulose hexahydrophthalate. Other suitable spacing agents have been described in U.S. Pat. No. 4,614,708.

The support of the photographic materials in connection with the present invention can be transparent base, preferably an organic resin support, e.g. cellulose nitrate film, cellulose acetate film, polyvinylacetal film, polystyrene film, polyethylene terephthalate film, polycarbonate film, polyvinylchloride film or poly-Alpha-olefin films such as polyethylene or polypropylene film. The thickness of such organic resin film is preferably comprised between 0.07 and 0.35 mm. These organic resin supports are preferably coated with a subbing layer. On the other hand the support of the photographic material can be a paper base preferably a polyethylene or polypropylene coated paper base.

The photographic materials according to the invention can be processed by any means or any chemicals known in the art depending on their particular application. In the case of red sensitive elements in the field of graphic arts for phototype- or image-setting they are preferably processed in so-called "Rapid Access" chemicals, comprising a conventional Pkenidone/hydrochinon developing solution and a conventional sodium or ammonium thiosulphate containing fixing solution. The development time is usually between 10 and 30 seconds at a temperature of about 35° C. Alternatively they can be processed in so-called "hard dot Rapid Access" chemistry, e.g. the AGFASTAR system marketed by Agfa-Gevaert N.V.. Preferably an automatically operated processor provided with automatic regeneration is used, e.g. a RAPILINE device marketed by Agfa-Gevaert N.V.

The following examples illustrate the present invention without however limiting it thereto.

EXAMPLES

Example 1

Preparation of invention dye (ID-1)

Step 1: synthesis of intermediate compound IMC-1

33.3 g of tetrahydroquinoline, 25.7 ml of butanesultone and 43.5 ml of diisopropylethylamine were mixed in a round-bottomed flask fitted with a stirrer, and the mixture was heated on an oil bath to 95° C. After 6 hours of stirring the reaction mixture was allowed to cool and the resulting oil was rinsed with 375 ml of methyl-t.butyl-ether. A solution of 28 g of potassium hydroxide in 750 ml of ethanol was added to the oily reaction mixture causing the precipitation of intermediate compound IMC-1.

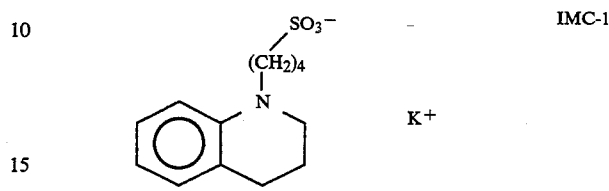

Step 2: synthesis of intermediate leuco-dye and of dye (ID-1)

In a round-bottomed flask equipped with a reflux condenser 20 g of this intermediate compound IMC-1 and 4.26 g of p-cyano-benzaldehyde were suspended in 400 ml of ethanol. 5.5 ml of concentrated hydrochloric acid solution were added. The mixture was refluxed overnight. Then 400 ml of water were added and the reaction mixture was made alkaline by means of potassium hydroxide. Finally 1000 ml of a saturated potassium chloride solution were added. A white precipitate, being the intermediate leuco form of the final dye, was formed and collected on a filter (yield: 99%).

The oxidation of this leuco dye to the final wanted triphenylmethane dye was performed as follows. 49 g of this leuco dye and 500 ml of methanol were stirred in a round-bottomed flask. Then 5.7 ml of concentrated hydrochloric acid solution was added followed by 17.7 g of manganese dioxide and 0.5 g of chloranil. After stirring for one hour the residual manganese dioxide was filtered off. The solvent was evaporated using a rotavapor and the resulting oil was dissolved in a mixture of 200 ml of acetonitrile and 200 ml of acetone. The desired dye compound (ID-1) precipitated and was collected on a filter (yield: 100 %).

Example 2

Synthesis of invention dye (ID-2)

In a round-bottomed flask equipped with a stirrer and a reflux condenser were placed successively 24.6 g of intermediate compound IMC-1, 6 g of p-nitro-benzaldehyde, 400 ml of ethanol and 10 ml of concentrated hydrochloric acid solution. This mixture was refluxed for 18 hours, then allowed to cool to room temperature and then further cooled in an ice bath. After adding 200 ml of ethylacetate the reaction mixture was stirred for one additional hour. A precipitate of leuco dye was formed and collected on a filter (yield: 100%).

18 g of this leuco dye, 200 ml of methanol, 6.2 g of manganese dioxide and 0.2 g of chloranil were mixed in a reactor. To this suspension 2 ml of concentrated hydrochloric acid solution was added. After stirring for one hour at room temperature the residual manganese dioxide was filtered off and the filtrate was evaporated to a volume of 100 ml. Then 100 ml of acetone was added causing the formed dye (ID-2) to crystallize (yield: 65%).

Example 3

Synthesis of invention dye (ID-3)

9.2 g of intermediate compound IMC-1 was suspended in 90 ml of ethanol. After adding 4 ml of concentrated hydrochloric acid solution the mixture was heated to 60° C. Then 1.6 ml of 4-pyridinecarboxaldehyde was added. After stirring for 6 hours an oil was formed which solidified on diluting with acetone giving rise to the leuco dye form (yield: 72%).

7.5 g of this leuco dye, 2.8 g of manganese dioxide, 0.08 g of chloranil and 150 ml of methanol were placed in a reaction vessel. 1 ml of concentrated hydrochloric acid solution dissolved in 50 ml of methanol was slowly added. After stirring for 1 hour the residual manganese dioxide was filtered off and the filtrate was evaporated to a volume of 30 ml. After the addition of 100 ml of acetone the dye compound (ID-3) precipitated and was filtered off (yield: 57%).

Example 4

Photographic evaluation

To 1 l of a solution, containing 28 g of gelatin, 540 ml of a 15% latex dispersion of conductive polymer Co(tetraallyloxyethanemethylacrylate-acrylic acid-potassium salt) was added. This solution was coated on a transparent polyethyleneterephtalate support having a thickness of 100 micron at a gelatin coverage of 0.56 g/m². This layer was overcoated with a second backing layer prepared as follows. To 1.8 l of a solution containing 103 g of gelatin 40 ml of "recognition dye" (RD-1) was added to improve the visual difference between backing layers and emulsion layer under blue-green darkroom illumination. Then anti-halation dyes in connection with the present invention were added as illustrated in table 1. Surfactants, silica and a polymeric matting agent were added giving rise to a coating solution. The layer was coated at a gelatin coverage of 2.12 g/m².

A high contrast cubic silver halide emulsion was prepared. It was sulfur plus gold sensitized and showed an average grain size of 0.30 μ. This emulsion contained 0.4% of iodide, 16% of bromide and 83.4% of chloride and was doped with rhodium and iridium. To 1 kg of this emulsion, containing 1.10 moles of silver halide, was added a conventional substituted tetraazaindene and a conventional substituted mercaptotetrazole as antifoggant agents. Red sensitizer (SD-1) was added at a concentration of 0.15 mmole per mole of silver halide. A bromide solution was added to adjust the pAg to a value corresponding to a silver potential of 90 mV, measured against a saturated calomel electrode. A plasticizing latex and surfactants were added giving rise to a coatable solution. The emulsion was coated at a coverage corresponding to 3.97 g of Ag/m² and at 2.9 g of gelatin/m². This photosensitive layer was overcoated with a layer containing 1 g of gelatin/m², minor amounts of dimethyl-Phenidone, p-carboxy-dimethyl-Phenidone and hydroquinone, a polymeric matting agent, surfactants and formaldehyde as gelatin hardener.

An absorption spectrum was measured for each sample. The data are given in % absorption (100 minus % transmission minus % reflection).

To determine speed the coatings were exposed on a laser sensitometer using a 670 nm laserdiode and a continuous wedge with a wedgeconstant of 0.10 log H/cm. The samples were processed in an automatic processor using a conventional hydroquinone-Phenidone developer, a conventional fixer containing ammonium thiosulphate, a rinsing step and a drying step. The total processing time was 65 seconds dry to dry. The temperature of the developer was 35 C.

The sensitivity was measured at a density of 3.00 above fog and expressed as relative log H values. A higher number means more sensitive. So an increase by a value of 0.30 means a doubling of speed.

Other samples of the coatings were exposed in an ACCUSET image-setter equipped with a 670 nm diode, marketed by Miles Inc., Agfa division. Electronic screen dot patterns of respectively 5, 50, 95 and 100% dot area were generated. After processing the image quality was determined by evaluating he edge sharpness and the practical maximum density (at 100% dot area) at that exposure setting where a 50% screen dot was reproduced at the correct size. The quality was expressed in relative terms. The results are summarized in table 1.

TABLE 1

| Dye | mg/m2 | % Absorption 630 nm | % Absorption 670 nm | Rel. Speed | Image Quality |
|---|---|---|---|---|---|
| ID-1 | 50 | 28 | 50 | 1.00 | best |
| ID-2 | 50 | 17 | 33 | 1.02 | good |
| ID-3 | 50 | 24 | 42 | 1.01 | good |
| CD-1 | 50 | 45 | 20 | 1.06 | bad |

These results illustrate the high absorption at 670 nm of the dyes used in accordance with this invention, the good image quality compared with conventional dyes, and good sensitivities showing only slight differences to the ones obtained with the control dye.

The processed samples showed no residual stain, even in a rapid processing cycle (45 seconds dry to dry).

We claim:

1. A compound represented by general formula (ID):

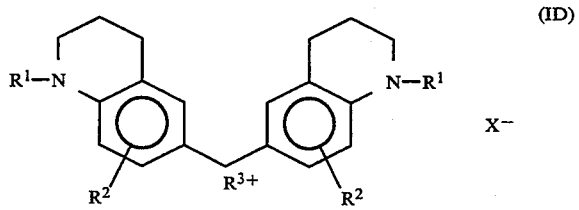

wherein $R^1$ and $R^2$ each independently represents hydrogen, unsubstituted or substituted alkyl, or unsubstituted or substituted aryl, $R^3$ represents an electron-withdrawing group, and the dye contains at least two water-solubilizing groups, and $X^-$ represents an anion, or an intramolecular anionic group.

2. A compound according to claim 1 wherein said electron-withdrawing group is selected from the group consisting of Cl, $COR^4$, $COOR^4$, $CF_3$, CN, $NO_2$, $SO_2R^4$, $CON(R^4)_2$,

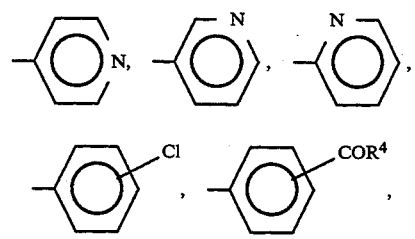

-continued

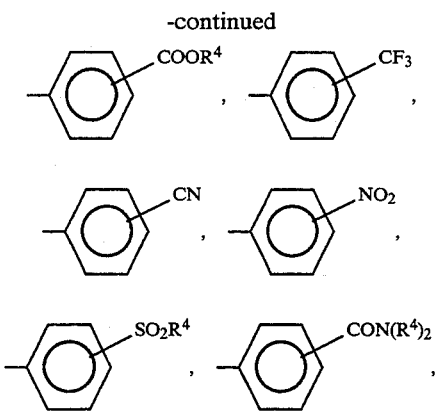

wherein $R^4$ has one of the significances given for $R^1$ and $R^2$.

3. A compound according to claim 1 wherein said at least two water-solubilizing groups are each independently selected from the group consisting of —SO$_3$H, —COOH, —SO$_2$NHR$^5$, —NHSO$_2$R$^5$, —CONHR$^5$ and

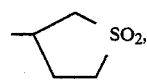

wherein $R^5$ has one of the significances given for $R^1$ and $R^2$.

4. A compound according to claim 1 and corresponding to following formula:

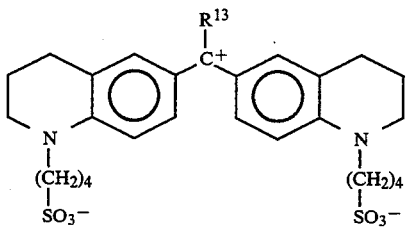

wherein $R^{13}$ is chosen from the group consisting of p-cyanophenyl, p-nitrophenyl, and p-pyridinyl, and M$^+$ is a cation.

* * * * *